(12) United States Patent
Ma et al.

(10) Patent No.: US 8,366,805 B2
(45) Date of Patent: Feb. 5, 2013

(54) COMPOSITE STRUCTURES WITH POROUS ANODIC OXIDE LAYERS AND METHODS OF FABRICATION

(75) Inventors: Yi Hua Ma, Worcester, MA (US); Ivan P. Mardilovich, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 410 days.

(21) Appl. No.: 12/594,415

(22) PCT Filed: Apr. 4, 2008

(86) PCT No.: PCT/US2008/004403
§ 371 (c)(1),
(2), (4) Date: Dec. 28, 2009

(87) PCT Pub. No.: WO2008/124062
PCT Pub. Date: Oct. 16, 2008

(65) Prior Publication Data
US 2010/0132546 A1    Jun. 3, 2010

Related U.S. Application Data

(60) Provisional application No. 60/921,902, filed on Apr. 5, 2007.

(51) Int. Cl.
*B01D 53/22* (2006.01)
*C23C 28/00* (2006.01)
(52) U.S. Cl. ............... 95/56; 95/45; 95/55; 96/4; 96/10; 96/11; 427/331; 427/372.2
(58) Field of Classification Search .............. 96/4, 8, 96/10, 11; 95/45, 55, 56; 55/486, 487, DIG. 5; 427/331, 372.2; 205/190, 199
See application file for complete search history.

(56) References Cited

U.S. PATENT DOCUMENTS 2,958,391 A    11/1960 deRosset
(Continued)

FOREIGN PATENT DOCUMENTS

AU    2004224365    10/2004
AU    2004224370    1/2008
(Continued)

OTHER PUBLICATIONS

Notification Concerning Transmittal of International Preliminary Report on Patentability, International Application No. PCT/US2008/004403, Date of Mailing Oct. 15, 2009.

(Continued)

*Primary Examiner* — Jason M Greene
(74) *Attorney, Agent, or Firm* — Hamilton, Brook, Smith & Reynolds, P.C.

(57) ABSTRACT

Composite structures are described that have a porous anodic oxide layer such as, for example, a porous anodic aluminum oxide layer. In one aspect, the present invention includes a composite gas separation module having a porous metal substrate; a porous anodic aluminum oxide layer, wherein the porous anodic aluminum oxide layer overlies the porous metal substrate; and a dense gas-selective membrane, wherein the dense gas-selective membrane overlies the porous anodic aluminum oxide layer. A composite filter is described having a porous non-aluminum metal substrate; and a porous anodic aluminum oxide layer, wherein the porous anodic aluminum oxide layer defines pores extending through the porous anodic aluminum oxide layer. Methods for fabricating composite gas separation modules and composite filters and methods for selectively separating hydrogen gas from a hydrogen gas-containing gaseous stream are also described.

11 Claims, 9 Drawing Sheets

U.S. PATENT DOCUMENTS

| | | | |
|---|---|---|---|
| 3,241,298 A | 3/1966 | Pierce | |
| 3,247,648 A | 4/1966 | McKinley | |
| 3,350,845 A | 11/1967 | McKinley | |
| 3,413,777 A | 12/1968 | Langley et al. | |
| 3,428,476 A | 2/1969 | Langley et al. | |
| 3,438,178 A | 4/1969 | Betteridge et al. | |
| 3,439,474 A | 4/1969 | McKinley | |
| 3,717,525 A | 2/1973 | Bultemann | |
| 4,056,373 A | 11/1977 | Rubin | |
| 4,496,373 A | 1/1985 | Behr et al. | |
| 4,589,891 A | 5/1986 | Iniotakis et al. | |
| 4,689,150 A | 8/1987 | Abe et al. | |
| 4,699,637 A | 10/1987 | Iniotakis et al. | |
| 4,857,080 A | 8/1989 | Baker et al. | |
| 5,049,167 A | 9/1991 | Castro et al. | |
| 5,139,541 A | 8/1992 | Edlund | |
| 5,205,841 A | 4/1993 | Vaiman | |
| 5,215,729 A | 6/1993 | Buxbaum | |
| 5,217,506 A | 6/1993 | Edlund et al. | |
| 5,255,742 A | 10/1993 | Mikus | |
| 5,258,339 A | 11/1993 | Ma et al. | |
| 5,259,870 A | 11/1993 | Edlund | |
| 5,358,553 A | 10/1994 | Najjar et al. | |
| 5,393,325 A * | 2/1995 | Edlund | 95/56 |
| 5,449,848 A | 9/1995 | Itoh | |
| 5,451,386 A | 9/1995 | Collins et al. | |
| 5,498,278 A | 3/1996 | Edlund | |
| 5,614,001 A | 3/1997 | Kosaka et al. | |
| 5,652,020 A | 7/1997 | Collins et al. | |
| 5,672,388 A | 9/1997 | McHenry et al. | |
| 5,738,708 A | 4/1998 | Peachey et al. | |
| 5,782,959 A | 7/1998 | Yang et al. | |
| 5,782,960 A | 7/1998 | Ogawa et al. | |
| 5,862,858 A | 1/1999 | Wellington et al. | |
| 5,895,769 A | 4/1999 | Lai | |
| 5,899,269 A | 5/1999 | Wellington | |
| 5,904,754 A | 5/1999 | Juda et al. | |
| 5,997,594 A | 12/1999 | Edlund et al. | |
| 6,019,172 A | 2/2000 | Wellington et al. | |
| 6,086,729 A | 7/2000 | Bredesen et al. | |
| 6,152,987 A * | 11/2000 | Ma et al. | 95/56 |
| 6,152,995 A | 11/2000 | Edlund | |
| 6,183,542 B1 | 2/2001 | Bossard | |
| 6,267,801 B1 | 7/2001 | Baake et al. | |
| 6,309,546 B1 | 10/2001 | Herrmann et al. | |
| 6,372,363 B1 | 4/2002 | Krueger | |
| 6,379,524 B1 | 4/2002 | Lee et al. | |
| 6,419,728 B1 | 7/2002 | Edlund | |
| 6,452,276 B1 | 9/2002 | Cohen et al. | |
| 6,475,268 B2 | 11/2002 | Thornton | |
| 6,547,858 B1 | 4/2003 | Edlund et al. | |
| 6,596,057 B2 | 7/2003 | Edlund et al. | |
| 6,730,145 B1 | 5/2004 | Li | |
| 6,916,454 B2 | 7/2005 | Alvin | |
| 6,964,697 B2 | 11/2005 | Pan et al. | |
| 7,018,446 B2 | 3/2006 | Alvin et al. | |
| 7,125,440 B2 | 10/2006 | Bossard et al. | |
| 7,172,644 B2 | 2/2007 | Ma et al. | |
| 7,175,694 B2 | 2/2007 | Ma et al. | |
| 7,255,726 B2 | 8/2007 | Ma et al. | |
| 7,390,536 B2 | 6/2008 | Ma et al. | |
| 2002/0020298 A1 | 2/2002 | Drost et al. | |
| 2002/0081845 A1 | 6/2002 | Lee et al. | |
| 2002/0083829 A1 | 7/2002 | Edlund et al. | |
| 2002/0141919 A1 | 10/2002 | Alvin | |
| 2002/0164496 A1 | 11/2002 | Saloka et al. | |
| 2002/0175418 A1 | 11/2002 | Cohen et al. | |
| 2003/0068269 A1 | 4/2003 | Matzakos et al. | |
| 2003/0183080 A1 | 10/2003 | Mundschau | |
| 2003/0190486 A1 | 10/2003 | Roa et al. | |
| 2003/0213365 A1 | 11/2003 | Jantsch et al. | |
| 2003/0222015 A1 | 12/2003 | Oyama et al. | |
| 2004/0037962 A1 | 2/2004 | Uemura et al. | |
| 2004/0129135 A1 | 7/2004 | Roark et al. | |
| 2004/0244589 A1 | 12/2004 | Bossard et al. | |
| 2005/0072304 A1 | 4/2005 | Etievant et al. | |
| 2006/0016332 A1* | 1/2006 | Ma et al. | 95/55 |
| 2006/0141486 A1* | 6/2006 | Coonan et al. | 435/6 |
| 2006/0188737 A1 | 8/2006 | Roa et al. | |
| 2006/0289351 A1 | 12/2006 | Xiao et al. | |
| 2007/0224399 A1* | 9/2007 | Rabin et al. | 428/209 |
| 2008/0143015 A1* | 6/2008 | Lee et al. | 264/220 |
| 2010/0132546 A1 | 6/2010 | Ma et al. | |
| 2011/0030382 A1* | 2/2011 | Eadon et al. | 96/11 |
| 2011/0303092 A1 | 12/2011 | Ma et al. | |

FOREIGN PATENT DOCUMENTS

| | | |
|---|---|---|
| AU | 2004224371 | 11/2008 |
| AU | 2004237778 | 11/2008 |
| AU | 2005275250 | 7/2009 |
| AU | 2005286952 | 9/2009 |
| AU | 2005286955 | 9/2009 |
| AU | 2005287034 | 9/2009 |
| CA | 2315029 | 12/2008 |
| DE | 101 35 390 A | 2/2003 |
| EP | 1 180 392 | 2/2002 |
| EP | 1 021 682 B1 | 3/2002 |
| EP | 1 208 904 A1 | 5/2002 |
| EP | 1 277 512 A | 1/2003 |
| EP | 1 042 049 | 3/2003 |
| EP | 1 603 660 | 9/2008 |
| EP | 1 622 698 | 1/2010 |
| FR | 2820 988 A | 8/2002 |
| JP | 62-259884 | 11/1987 |
| JP | 02-271901 | 11/1990 |
| JP | 4-346824 | 2/1992 |
| JP | 5-285357 | 2/1993 |
| JP | 5-317662 | 3/1993 |
| JP | 5085702 | 4/1993 |
| JP | 05-123548 | 5/1993 |
| JP | 10-028850 | 2/1998 |
| JP | 2000005580 A | 11/2000 |
| JP | 2001-286742 | 10/2001 |
| JP | 2002/219343 | 6/2002 |
| JP | 2002-219341 | 8/2002 |
| JP | 2002-355537 | 12/2002 |
| JP | 2003290636 A | 10/2003 |
| WO | WO 99/30806 | 6/1999 |
| WO | WO 99/33545 | 7/1999 |
| WO | WO 02/064241 | 8/2002 |
| WO | WO 02/066144 | 8/2002 |
| WO | WO 03/011433 A1 | 2/2003 |
| WO | WO 2004/022480 | 3/2004 |
| WO | WO 2004/085034 | 10/2004 |
| WO | WO 2004/085044 | 10/2004 |
| WO | WO 2004/098751 | 11/2004 |
| WO | WO 2005/075060 A1 | 8/2005 |
| WO | WO 2006/019805 | 2/2006 |
| WO | WO 2006/033267 | 3/2006 |
| WO | WO 2006/034100 | 3/2006 |
| WO | WO 2006/034103 | 3/2006 |
| WO | WO 2008/124062 | 10/2008 |

OTHER PUBLICATIONS

Ayturk, M.E., "Synthesis, annealing strategies and in-situ characterization of thermally stable composite thin Pd/Ag alloy membranes for $H_2$ separation," Worcester Polytechnic Institute, Ph.D. Thesis, 2007.

Ayturk, M.E., et al.,"Synthesis of composite Pd-porous stainless steel (PSS) membranes with a Pd/Ag intermetallic diffusion barrier," *J. Membr. Sci.*, 285: 385 (2006).

Ayturk, M.E., et al., "Electroless Pd and Ag Deposition Kinetics of the Composite Pd and Pd/Ag Membranes Synthesized from Agitated Plating Baths," *J. Mem. Sci.*, 330: 233-245 (2009).

Bitler, W.R., et al., "Interdiffusion kinetics of copper with palladium," *Plat. Surf. Finish.*, 72: 60 (1985).

Bredesen, R. et al., "High-temperature membranes in power generation with $CO_2$ capture," *Chem. Eng. Process*, 43: 1129 (2004).

Butrymowicz, D.B., et al., "Diffusion in copper and copper alloys. Part IV. Diffusion in systems involving elements of Group VIII," *J. Phys. Chem. Ref. Data*, 5: 103 (1976).

Donahue, F., and Shippey, F.L., "Kinetics of electroless copper plating. II. Mixed potential analysis," *Plating*, 60: 135 (1973).

Donahue, F.M., "Kinetics of electroless copper plating. III. Mass transport effects," *J. Electrochem. Soc.*, 127: 51 (1980).

Donahue, F.M., "Kinetics of electroless copper plating. V. Mass transport at cylindrical surfaces," *J. Electrochem. Soc.*, 128: 2366 (1981).

Donahue, F.M., et al.,"Kinetics and electroless copper plating. IV. Empirical rate law for formaldehyde—EDTA baths," *J. Electrochem. Soc.*, 127: 2340 (1980).

Dumesic, J., et al., "Rate of electroless copper deposition by formaldehyde reduction," *J. Electrochem. Soc.*, 121: 1405 (1974).

Edlund, D.J. and McCarthy, J., The Relationship Between Intermetallic Diffusion and Flux Decline in Composite-Metal Membranes: Implications for Achieving Long Membrane Lifetime, *J. Mem. Sci.*, 107: 147-153 (1995).

Gao, H., et al., "Electroless plating synthesis, characterization, and permeation properties of Pd-Cu membranes supported on $ZrO_2$ modified porous stainless steel," *J. Membr. Sci.*, 265: 142 (2005).

Grashoff, G.J. et al., "The purification of hydrogen: A review of the technology emphasizing the current status of palladium membrane diffusion," *Platinum Met. Rev.*, 27:157 (1983).

Gryaznov, V. M., "Metal Containing Membranes for the Production of Ultrapure Hydrogen and the Recovery of Hydrogen Isotopes," *Separation and Purification Methods* (now *Separation and Purification Reviews*), 29(2):171-187 (2000).

Gryaznov, V. M., et al., "Preparation and catalysis over Palladium Composite Membranes," *Applied Catalysis A: General*, 96:15-23 (1993).

Guazzone, F. and Ma, Y.H., "Leak growth mechanism in composite Pd membranes prepared by the electroless deposition method," *AICHE J.*, 54: 487 (2008).

Guazzone, F., "Engineering of substrate surface for the synthesis of ultra-thin composite palladium and palladium-copper membranes for hydrogen separation," Worcester Polytechnic Institute, Ph.D. Thesis, 2006.

Guazzone, F., et al., "Microstrains and stresses analysis in electroless deposited thin Pd films," *Ind. Eng. Chem. Res.*, 45: 8145 (2006).

Howard, B.H., et al., "Hydrogen permeance of palladium-copper alloy membranes over a wide range of temperatures and pressures," *J. Membr. Sci.*, 241: 207 (2004).

Kajiwara, M., et al., "Stability and hydrogen permeation behavior of supported platinum membranes in presence of hydrogen sulfide," *Int. J. Hydrogen Energy.*, 24: 839 (1999).

Knapton, A.G., "Palladium alloys for hydrogen diffusion membranes," *Platinum Met. Rev.*, 21: 44 (1977).

Kulprathipanja, A., et al., "Pd and Pd-Cu membranes: inhibition of $H_2$ permeation by $H_2S$," *J. Membr. Sci.*, 254: 49 (2005).

Ma, Y. H., et al., "Characterization of Intermetallic Diffusion Barrier and Alloy Formation for Pd/Cu and Pd/Ag Porous Stainless Steel Composite Membranes," *I &EC Research*,43:2936-2945 (2004).

Ma, Y.H., et al., "Thin Composite Palladium and Palladium/Alloy Membranes for Hydrogen Separation," *Ann. N.Y. Acad. Sci.*, 984: 346-360 (2003).

Mardilovich, I.P., et al., "Dependence of Hydrogen Flux on the Pore Size and Plating Surface Topology of Asymmetric Pd-Porous Stainless Steel Membranes," *Desalination*, 144:85-89 (2002).

Mardilovich, P.P., et al., "Defect-free palladium membranes on porous stainless-steel support," *AIChE J.*, 44: 310 (1998).

Molenaar, A., et al., "Kinetics of electroless copper plating with EDTA as the complexing agent for cupric ions," *Plating*, 61: 238 (1974).

Morreale, B.D., et al., "Effect of hydrogen-sulfide on the hydrogen permeance of palladium-copper alloys at elevated temperatures," *J. Membr. Sci.*, 241: 219 (2004).

Mundschau, M.V., et al., "Dense inorganic membranes for production of hydrogen from methane and coal with carbon dioxide sequestration," *Catal. Today*, 118:12 (2006).

Nam, S.-E., et al., "Hydrogen Separation by Pd Alloy Composite Membranes," *J. Membrane Sci.*, 192:177-185 (2001).

Ozaki, T., et al., "Preparation of Palladium-coated V and V-15 Ni Membranes for Hydrogen Purification by Electroless Plating Technique," *Int. J. Hydrogen Energy*, 28:297 (2003).

Pan, X., et al., "Low-temperature $H_2$ and $N_2$ transport through thin $Pd_{66}Cu_{34}H_x$ layers," *Catal. Today*, 104: 225 (2005).

PCT/US2008/004403: Notification of Transmittal of the International Search Report and the Written Opinion of the International Searching Authority, or the Declaration dated Jun. 12, 2008.

PCT/US2008/004403: Notification Concerning Transmittal of International Preliminary Report on Patentability dated Oct. 15, 2009.

Pomerantz et al., "Isothermal solid-state transformation kinetics applied to Pd/Cu alloy membrane fabrication," *AIChE J.*, 56(12) 3062-3073 (2010).

Pomerantz, N. and Ma, Y.H., "Effect of $H_2S$ on the Performance and Long-Term Stability of Pd/Cu Membranes," *Ind. Eng. Chem. Res.*, 48: 4030-4039 (2009).

Roa, F., "Preparation and Characterization of Pd-Cu Composite Membranes for Hydrogen Separation," *Chem. Eng. J.*, 93:11 (2003).

Roa, F., and Way, J.D., "Influence of alloy composition and membrane fabrication on the pressure dependence of the hydrogen flux of palladium-copper membranes," *Ind. Eng. Chem. Res.*, 42: 5827 (2003).

Roa, F., et al., "The Influence of Alloy Composition on The $H_2$ Flux of Composite Pd-Cu Membranes," *Desalination*, 147:411-416 (2002).

Saini, A., "An investigation of the cause of leak formation in palladium composite membranes," Worcester Polytechnic Institute, M.S. Thesis, 2006.

Shirasaki, Y., et al., "Development of membrane reformer system for highly efficient hydrogen production from natural gas," *Int. J. Hydrogen Energy*, 34: 4482 (2009).

Shu, J., et al., "Structurally Stable Pd-Ag Alloy Membranes: Introduction of a Diffusion Barrier," *Thin Solid Films*, 286:72-79 (1996).

Subramanian, P.R. and Laughlin, D.E., "Cu-Pd (copper-palladium)," *J. Phase Equilib.*, 12:231 (1991).

Thoen, P.M., et al., "High flux palladium-copper composite membranes for hydrogen separations," *Desalination*, 193: 224 (2006).

Uemiya, S., et al., "Separation of hydrogen through palladium thin film supported on a porous glass tube," *J. Membr. Sci.*, 56: 303 (1991).

Zhang X., et al., "Hydrogen transport through thin palladium-copper alloy composite membranes at low temperatures," *Thin Solid Films*, 516: 1849 (2008).

Patent abstract of Japan, vol. 017, No. 400 (C-1089), (JP 05 076738 A, Mar. 30, 1993) (Jul. 27, 1993).

Patent abstract of Japan, vol. 010, No. 335 (C-384), (JP 61 138516 A, Jun. 26, 1986) (Nov. 13, 1993).

Database WPI, Derwent Publications Ltd., AN 84188007, XP 002097090 (SU 1 058 587 A, Dec. 7, 1983).

Database JAPIO, Japan Patent Information Organization, AN 92-326931 (JP 04-326931, Nov. 16, 1992).

\* cited by examiner

FIG. 2A
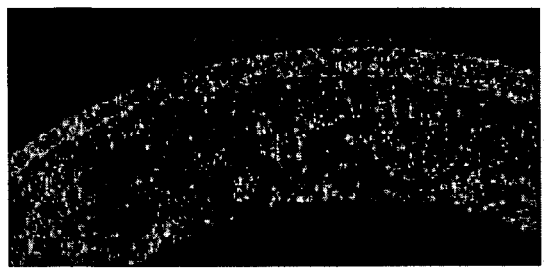
FIG. 2B
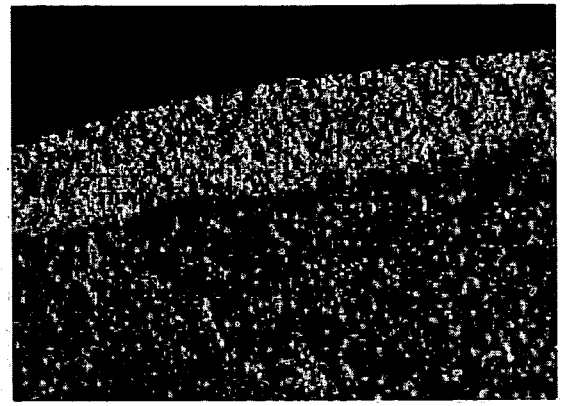
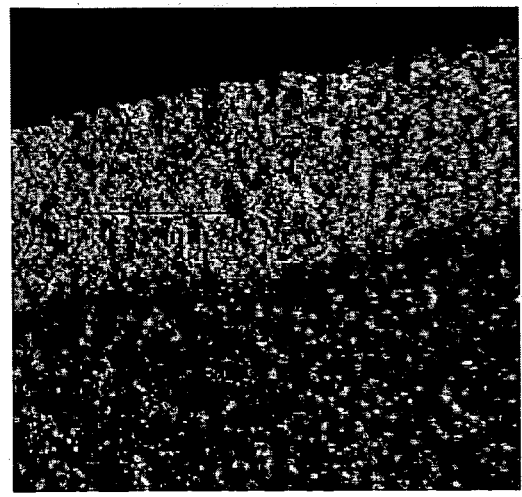
FIG. 2C
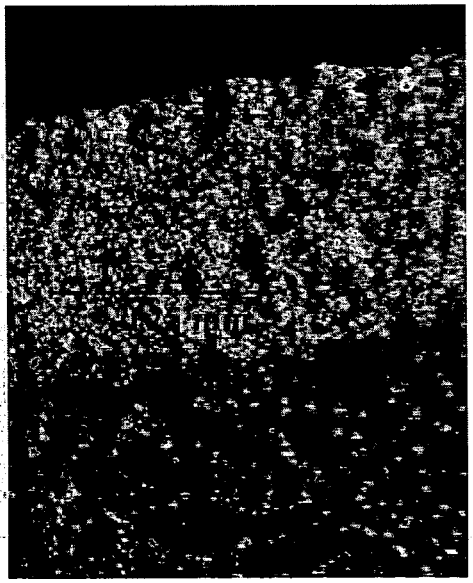
FIG. 2D

FIG. 8A
FIG. 8B
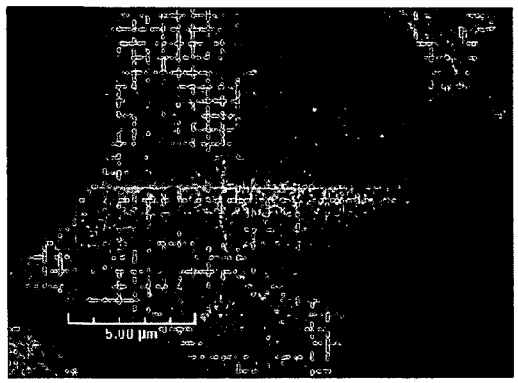
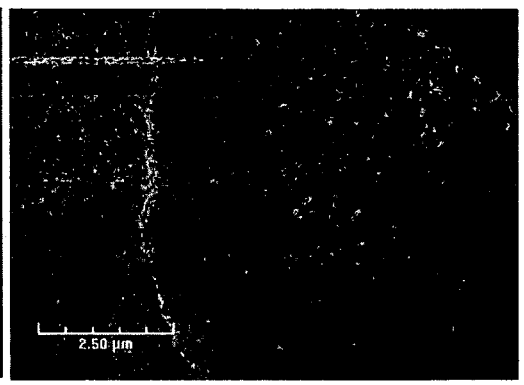
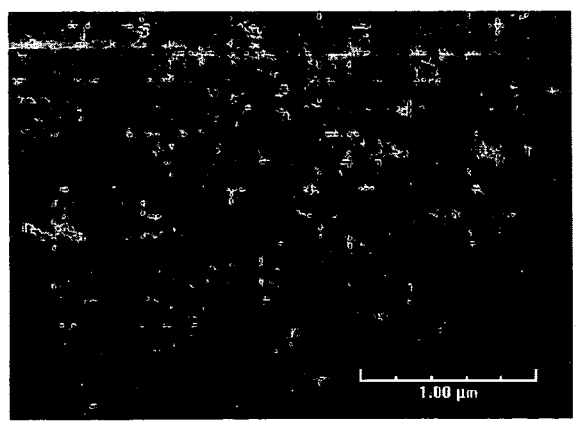
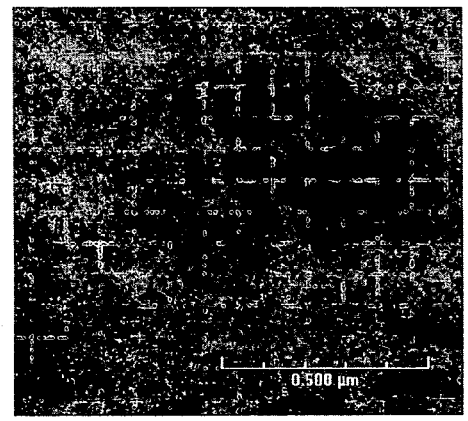
FIG. 9A
FIG. 9B

COMPOSITE STRUCTURES WITH POROUS ANODIC OXIDE LAYERS AND METHODS OF FABRICATION

RELATED APPLICATION

This application is the U.S. National Stage of International Application No. PCT/US2008/004403, filed Apr. 4, 2008, which designates the U.S., published in English, and claims the benefit of U.S. Provisional Application No. 60/921,902, filed on Apr. 5, 2007. The entire teachings of the above application are incorporated herein by reference.

BACKGROUND OF THE INVENTION

Gas separation modules are commonly used to selectively separate a particular gas from a gas mixture. Two of the most common gas separation modules are polymer membranes and metallic composites. Polymer membranes can provide an effective and cost-efficient option for separating a gas at low temperatures. Where separations must be performed in conjunction with high-temperature processing, however, polymer membranes are generally unsuitable because they tend to thermally decompose.

The development of high-temperature processing, along with tighter environmental regulations, requires utilization of gas separation modules that provide high flux, high selectivity of separation, and the ability to operate at elevated temperatures. Instead of polymers, metallic composite modules can be employed to serve these needs. A composite gas separation module can consist of a metallic membrane having selective gas permeability mounted on a porous substrate.

An area of high-temperature gas separation that is of particular interest is the separation and purification of hydrogen gas from a reaction gas mixture. A composite module for selectively separating hydrogen gas at high temperatures can include a palladium (Pd) membrane. Ideally, the palladium membrane is permeable to hydrogen but not to other gases. When hydrogen gas ($H_2$) contacts the membrane, the hydrogen molecules dissociate and hydrogen atoms diffuse into the membrane. Accordingly, hydrogen can selectively pass from a surrounding atmosphere through the palladium membrane. The selectively separated hydrogen atoms then reassociate into $H_2$ gas and pass into a volume on the opposite side of the module.

The effective life of a typical composite gas separation module having a hydrogen-selective metal membrane bonded to a porous substrate often is limited by diffusion of substrate components into the membrane which decreases the hydrogen permeability of the membrane. If there is an interface between two metals, thermal (atomic) vibration can significantly increase the mobility of metal atoms and their consequent diffusion. At temperatures around 550° C. considerable thermal vibration and diffusion of stainless steel substrate components into a palladium membrane can be expected in a composite gas separation module having these components. The alloy created by the diffusion of stainless steel substrate components into a palladium membrane can have reduced hydrogen permeability.

One solution to this problem has been to use a ceramic substrate, which tends to exhibit less diffusion of substrate components into the hydrogen-selective metal membrane than a predominantly metallic substrate. However, ceramic substrates are typically more brittle than predominantly metallic substrates. Further, ceramic substrates can be more difficult to fabricate and also can be more difficult to join to other components in a gas separation system.

Gas separation modules formed purely of a hydrogen-selective metal such as palladium have been used. Eliminating the presence of the substrate in such a gas separation module can remove the problem of intermetallic diffusion. However, such a module can be very expensive to produce and can lack the mechanical strength that can be required for high pressure and/or high temperature applications. For example, a gas separation module formed purely of a hydrogen-selective metal generally must have a much greater thickness than a composite gas separation module to provide adequate mechanical strength. This increase in thickness can reduce the gas flux that can be established through the module.

Therefore, a need exists for composite gas separation modules (and methods for their fabrication) that overcome or minimize the above-referenced problems.

SUMMARY OF THE INVENTION

The present invention includes composite structures that have a porous anodic oxide layer such as, for example, a porous anodic aluminum oxide layer. In one aspect, the present invention includes a composite gas separation module having a porous anodic oxide layer such as, for example, a porous anodic aluminum oxide layer. In another aspect, the present invention includes a composite filter having a porous anodic oxide layer such as, for example, a porous anodic aluminum oxide layer. The present invention also includes methods for fabricating a composite gas separation module and a composite filter and methods for selectively separating hydrogen gas from a hydrogen gas-containing gaseous stream.

In one embodiment, a composite gas separation module includes a porous metal substrate; a porous anodic aluminum oxide layer, wherein the porous anodic aluminum oxide layer overlies the porous metal substrate; and a dense gas-selective membrane, wherein the dense gas-selective membrane overlies the porous anodic aluminum oxide layer.

A method for fabricating a composite gas separation module includes applying a porous anodic aluminum oxide layer over a porous metal substrate; and applying a dense gas-selective membrane over the porous anodic aluminum oxide layer, thereby forming the composite gas separation module.

In some embodiments, applying a porous anodic aluminum oxide layer over a porous metal substrate includes applying an aluminum metal layer over the porous metal substrate; oxidizing the aluminum metal layer by anodic oxidation, thereby forming a first anodic aluminum oxide layer; removing at least a portion of the first anodic aluminum oxide layer, thereby forming a template, wherein the template includes unoxidized aluminum metal; and oxidizing the aluminum metal of the template by anodic oxidation, thereby forming the porous anodic aluminum oxide layer.

In one embodiment, after oxidizing the aluminum metal of the template by anodic oxidation, a non-porous anodic aluminum oxide layer, or barrier anodic aluminum oxide layer, is present. This non-porous anodic aluminum oxide layer can, in some instances, lie between the porous metal substrate and the porous anodic aluminum oxide layer or can block holes or pores of the porous anodic aluminum oxide layer. Thus, one aspect of the present invention includes removing portions of the non-porous anodic aluminum oxide layer, thereby creating or enlarging holes or pores that extend through the anodic aluminum oxide layer (and, in some instances, through a non-porous anodic aluminum oxide layer) to the porous metal substrate.

The present invention also includes composite gas separation modules formed by these methods.

In one embodiment of the invention, a method for selectively separating hydrogen gas from a hydrogen gas-containing gaseous stream includes directing the hydrogen gas-containing gaseous stream to a composite gas separation module, wherein the composite gas separation module includes a porous metal substrate; a porous anodic aluminum oxide layer, wherein the porous anodic aluminum oxide layer overlies the porous metal substrate; and a dense hydrogen-selective membrane, wherein the dense hydrogen-selective membrane overlies the porous anodic aluminum oxide layer, whereby hydrogen gas is at least partially partitioned from the gaseous stream by passing through the dense hydrogen-selective membrane.

According to one embodiment, a composite filter includes a porous non-aluminum metal substrate; and a porous anodic aluminum oxide layer, wherein the porous anodic aluminum oxide layer overlies the porous non-aluminum metal substrate, and wherein the porous anodic aluminum oxide layer defines pores extending from a first side of the porous anodic aluminum oxide layer through the porous anodic aluminum oxide layer to a second side of the porous anodic aluminum oxide layer.

A method for fabricating a composite filter includes applying an aluminum metal layer over a porous non-aluminum metal substrate; oxidizing the aluminum metal layer by anodic oxidation, thereby forming a first anodic aluminum oxide layer; removing at least a portion of the first anodic aluminum oxide layer, thereby forming a template, wherein the template includes unoxidized aluminum metal; and oxidizing the aluminum metal of the template by anodic oxidation, thereby forming a porous anodic aluminum oxide layer.

In one embodiment, after oxidizing the aluminum metal of the template by anodic oxidation, a non-porous anodic aluminum oxide layer, or barrier anodic aluminum oxide layer, is present. This non-porous anodic aluminum oxide layer can, in some instances, lie between the porous metal substrate and the porous anodic aluminum oxide layer or can block hole or pores of the porous anodic aluminum oxide layer. Thus, one aspect of the present invention includes removing portions of the non-porous anodic aluminum oxide layer, thereby creating or enlarging holes or pores that extend through the anodic aluminum oxide layer (and, in some instances, through a non-porous anodic aluminum oxide layer) to the porous metal substrate.

The present invention also includes a composite filter formed by this method.

The performance of composite gas separation modules can be limited by the thickness of the constituent dense hydrogen-selective membrane; the number and size of defects (e.g., pores, holes, cracks or other physical conditions that impair the gas-selectivity of the composite gas separation module by allowing the passage of an undesired gas) in the membrane; and the composition of the membrane. To obtain efficient separation, a dense hydrogen-selective membrane should not be breached by regions or points which do not produce the desired gas selectivity by allowing the passage of an undesired gas.

In one embodiment, the intermediate porous metal layer has a smaller pore size than the porous metal substrate. Since the effective pore size of the support is made smaller, less hydrogen-selective metal can be used to form a dense hydrogen-selective membrane. Thus, a composite gas separation module having a dense hydrogen-selective membrane thinner than dense hydrogen-selective membranes of conventionally produced composite gas separation modules can be fabricated. Forming a thinner dense hydrogen-selective membrane can also simplify manufacturing by reducing the number of layers of hydrogen-selective metal that must be applied to the porous substrate to form a dense hydrogen-selective membrane. Therefore, practice of the present invention can reduce manufacturing costs, e.g., material, labor and capital costs, for fabricating composite gas separation modules as compared to conventional fabrication techniques.

Since thinner dense hydrogen-selective membranes typically produce higher rates of gas flux, composite gas separation modules fabricated as described herein can produce higher rates of gas flux, e.g., hydrogen flux. Thus, gas separation processes utilizing the composite gas separation modules described herein can achieve higher rates of gas separation than is possible using conventional composite gas separation modules employing thicker dense hydrogen-selective membranes.

Practice of the present invention can protect against diffusion of substrate components into a dense gas-selective membrane. By preventing or reducing the diffusion of substrate components into the dense gas-selective membrane, the gas permeation flux through the composite gas separation module can be maintained throughout operation of the composite gas-separation module in a gas separation process. In addition, the methods described herein for preventing or reducing the diffusion of substrate components into the dense gas-selective membrane are economical and relatively simple to perform.

The composite filters described herein can be useful for high stress applications and high temperature applications. Such filters should be useful for a range of applications such as for filtering nano-sized materials in high stress and high temperature environments. In particular, the described methods for fabricating composite filters are relatively simple and should be quite cost effective to perform.

BRIEF DESCRIPTION OF THE DRAWINGS

The foregoing will be apparent from the following more particular description of example embodiments of the invention, as illustrated in the accompanying drawings. The drawings are not necessarily to scale, emphasis instead being placed upon illustrating embodiments of the present invention.

FIGS. 2A to 2D are optical micrographs of a cross section of an aluminized porous stainless steel ("PSS") tube under various magnifications.

FIG. 7 also contains SEM images of the aluminum surface after treatment in an anodizing cell.

FIGS. 8A and 8B are magnified views of the point marked by the arrow in FIG. 7.

FIGS. 9A and 9B are SEM images of a porous anodic aluminum oxide layer.

DETAILED DESCRIPTION OF THE INVENTION

Figure 1:
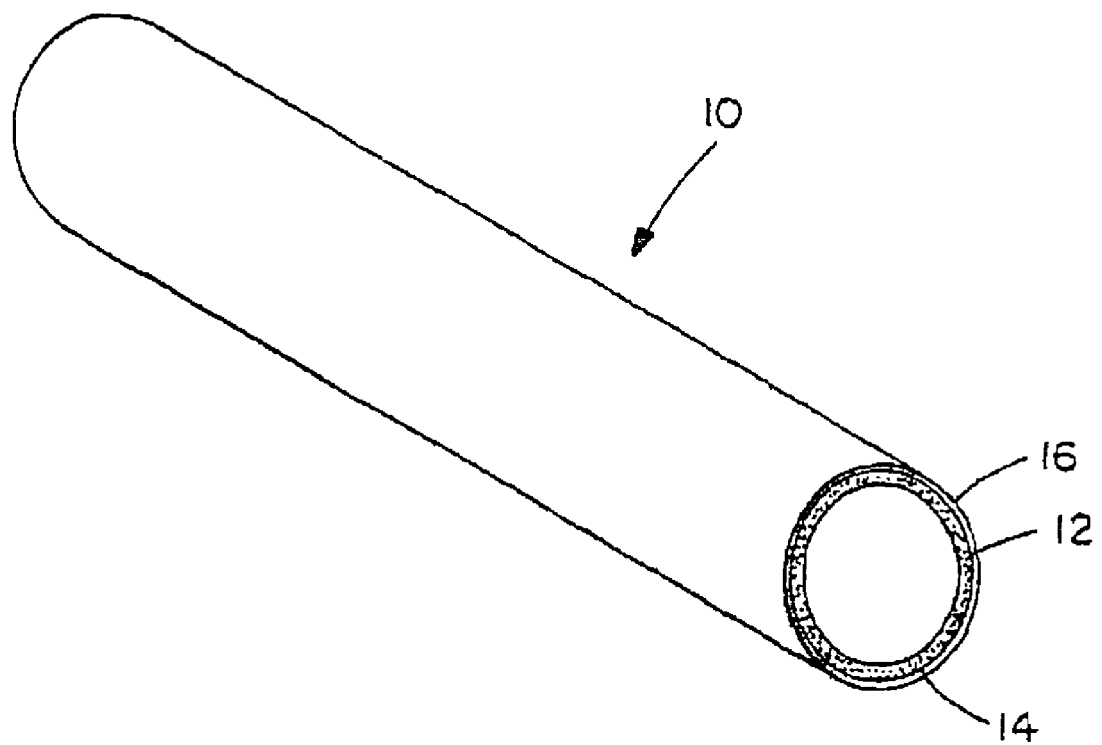
FIG. 1 is a sectional perspective view of a composite gas separation module as one embodiment of the present invention.

The features and other details of the method of the invention will now be more particularly described with reference to the accompanying drawings and pointed out in the claims. It will be understood that the particular embodiments of the invention are shown by way of illustration and not as limitations of the invention. The principal features of this invention can be employed in various embodiments without departing from the scope of the invention.

The present invention includes a composite gas separation module, comprising: (a) a porous metal substrate; (b) a porous anodic aluminum oxide layer, wherein the porous anodic aluminum oxide layer overlies the porous metal substrate; and (c) a dense gas-selective membrane, wherein the dense gas-selective membrane overlies the porous anodic aluminum oxide layer. In preferred embodiments, the porous anodic aluminum oxide layer defines holes or pores that extend through the porous anodic aluminum oxide layer from the porous metal substrate to the dense gas-selective membrane.

The composite gas separation modules described herein include a dense gas-selective membrane such as, for example, a dense hydrogen-selective membrane. The dense hydrogen-selective membrane can include, for example, palladium or an alloy thereof. A "dense gas-selective membrane," as that term is used herein, refers to a component of a composite gas separation module that has one or more layers of a gas-selective material, i.e., a material that is selectively permeable to a gas, and that is not materially breached by regions or points which impair the separation of the gas by allowing the passage of an undesired gas. For instance, in one embodiment, the dense gas-selective membrane is not materially breached by regions or points which do not have the desired gas selectivity properties of the gas-selective material. An example of a dense gas-selective membrane is a dense hydrogen-selective membrane that is substantially free of defects such as open pores, holes, cracks and other physical conditions that impair the gas-selectivity of the composite gas separation module by allowing the passage of an undesired gas. In some embodiments, a dense gas-separation membrane can contain one or more non-metallic components, however, the dense gas-separation membranes described herein generally contain at least one metallic component (e.g., a hydrogen-selective metal such as palladium or an alloy thereof).

The term "support," as used herein, includes a substrate, a surface treated substrate, a substrate upon which a material (e.g., a gas-selective material) has been deposited, a substrate with an overlying intermediate porous metal layer, or a subsequently plated substrate upon which a dense gas-selective membrane has been or will be formed. Serving as a support structure, the substrate can enhance the durability and strength of the composite gas separation module.

"Gas-selective material," as used herein, refers to those materials which, when formed into dense gas-selective membranes, allow the passage of a select gas, or select gases, through the dense gas-selective membrane. Suitable gas-selective materials include metals, ceramics (e.g., perovskite and perovskite-like materials) and zeolites (e.g., MFI and Zeolites A, X, etc.). In one embodiment, the gas-selective material is a hydrogen-selective metal such as palladium or an alloy thereof. Examples of suitable palladium alloys include palladium alloyed with at least one of the metals selected from the group consisting of copper, silver, gold, platinum, ruthenium, rhodium, yttrium, cerium and indium. For example, palladium/silver and palladium/copper alloys can be used to form dense hydrogen-selective membranes. In one embodiment, the gas-selective material is a ceramic such as oxygen gas-selective perovskite.

The side of the support upon which the dense gas-selective membrane is formed is referred to herein as the "outside" or "membrane-side" and the opposite side of the support is called the "inside" or "substrate-side" surface. However, it should be noted that the dense gas-selective membrane can be formed on the exterior surface and/or the interior surface of the substrate. For example, the dense gas-selective membrane can be formed on either or both surfaces of a planar substrate or can be formed on the exterior and/or interior surfaces of a substrate tube. Preferably, the dense gas-selective membrane is formed on only one surface of the substrate, for example, on either the exterior or the interior surface of a substrate tube.

In one embodiment, the gas-selective material can include a combination of substances, for example, a combination of a hydrogen-selective metal and a zeolite. In one embodiment, the zeolite used in a combination of substances is gas-selective. In an alternative embodiment, the zeolite used in a combination of substances is not gas-selective, for example, the zeolite used in a combination of substances is not hydrogen-selective.

Specific embodiments of the invention, including the composite gas separation modules, methods for fabricating the composite gas separation modules, and the method for selectively separating hydrogen gas from a hydrogen gas-containing gaseous stream follow.

FIG. 1 illustrates cylindrical composite gas separation module 10 as one embodiment of the invention. Composite gas separation module 10 includes porous metal substrate 12, porous anodic aluminum oxide layer 14, and dense gas-selective membrane 16. As illustrated, porous anodic aluminum oxide layer 14 and dense gas-selective membrane 16 overlie the outside surface of cylindrical porous substrate 12. In alternative embodiments not illustrated, porous anodic aluminum oxide layer 14 and dense gas-selective membrane 16 can overlie the interior surface of cylindrical porous substrate 12 (with the dense gas-selective membrane forming the innermost of the three cylindrical layers) or can overlie both the interior and the exterior surfaces of porous substrate 12. In a preferred embodiment, porous anodic aluminum oxide layer 14 and dense gas-selective membrane 16 overlie only either the interior or the exterior surface of porous substrate 12. The composite gas separation module can take any of a variety of forms including a cylindrical tube, as illustrated in FIG. 1, or a planar surface.

The composite gas separation module of the invention (and also the composite filter described infra) includes a porous metal substrate. The porous metal substrate can be formed from any of a variety of components known to those of ordinary skill in the art. Examples of suitable substrate components include, but are not limited to, iron, nickel, titanium, chromium, aluminum, and alloys thereof, e.g., steel, stainless steel, HASTELLOY® alloys (e.g., HASTELLOY® C-22®) (trademarks of Haynes International, Inc., Kokomo, Ind.) and INCONEL® alloys (INCONEL is a trademark of Huntington Alloys Corp., Huntington W. Va.). In one embodiment, the porous metal substrate is an alloy containing chromium and nickel. In an additional embodiment, the alloy contains chromium, nickel and molybdenum such as, for example, HASTELLOY® C-22® or an INCONEL® alloy. The porous metal substrate can be porous stainless steel. Cylinders of porous stainless steel that are suitable for use as substrates are available from Mott Metallurgical Corporation (Farmington, Conn.) and from Pall Corporation (East Hills, N.Y.), for example. In one embodiment, the porous metal substrate is a porous non-aluminum metal substrate.

One of ordinary skill in the art can select substrate thickness, porosity, and pore size distribution using techniques known in the art. Desired substrate thickness, porosity and pore size distribution can be selected based on, among other factors, the operating conditions of the final composite gas separation module such as operating pressure and temperature. Substrates having generally higher porosities and generally smaller pore sizes are particularly suited for producing composite gas separation modules. In some embodiments, the substrate can have a porosity in a range of about 5 to about 75% or about 15 to about 50%. While the pore size distribution of a substrate can vary, the substrate can have pore diameters that range from about 0.1 microns or less to about 15 microns or more. Generally, smaller pore sizes are preferred. In some embodiments, the mean or median pore size of the substrate can be about 0.1 to about 15 microns, e.g., from about 0.1 to about 1, 3, 5, 7 or about 10 microns. For example, the substrate can be an about 0.1 micron grade substrate to an about 0.5 micron grade substrate, e.g., 0.1 micron, 0.2 micron, and 0.5 micron grades of stainless steel substrates can be used. In one embodiment, the substrate is 0.1 micron grade HASTELLOY® alloy.

The composite gas separation module also includes a porous anodic aluminum oxide layer, wherein the porous anodic aluminum oxide layer overlies the porous metal substrate. In one embodiment, for example, the porous anodic aluminum oxide layer has a top side and a bottom side and the porous anodic aluminum oxide layer is directly adjacent to the porous metal substrate on the bottom side and is directly adjacent to the dense gas-selective membrane on the top side.

In some embodiments, the porous anodic aluminum oxide layer is at least about 10 microns thick such as at least about 25, 50, 75, 100, or about 150 microns thick.

The porous anodic aluminum oxide layer can define holes or pores extending from a first side of the porous aluminum oxide layer through the porous anodic aluminum oxide layer to a second side of the porous anodic aluminum oxide layer.

In general, the holes or pores of the porous anodic aluminum oxide layer are smaller than the pores of the porous metal substrate. The holes or pores of the porous anodic aluminum oxide layer can be, for example, nanometer-scale holes or pores. In some embodiments, the porous anodic aluminum oxide layer defines holes or pores with a mean diameter of about 1 nanometers (nm) to about 1000 nm. For example, the porous anodic aluminum oxide layer can define holes or pores having an mean diameter of less than about 500 nm, 200 nm, or less than about 100 nm.

In some aspects of the invention, the porous metal substrate defines holes or pores having an first mean diameter, wherein the porous anodic aluminum oxide layer defines holes or pores having a second mean diameter, and wherein the second mean diameter is less than the first mean diameter. For example, the first mean diameter can be less than about half of the first mean diameter or less than about one-tenth of the first mean diameter. In some embodiments, the largest hole or pore of the porous anodic aluminum oxide layer is smaller than the largest hole or pore of the porous metal substrate.

In some embodiments, the porous anodic aluminum oxide layer overlies a layer of aluminum metal. For example, the porous anodic aluminum oxide layer has a top side and a bottom side and the porous anodic aluminum oxide layer can be directly adjacent to an aluminum metal layer on the bottom side and can be directly adjacent to the dense gas-selective membrane on the top side, wherein the aluminum metal layer is directly adjacent to the porous metal substrate.

The porous anodic aluminum oxide layer can protect against intermetallic diffusion between the porous metal substrate and the dense gas-selective membrane.

While, in general, the present invention is described with reference to a anodic aluminum oxide layers, other anodic oxide layers can be readily substituted for the described anodic aluminum oxide layer. Examples of such anodic oxide layers include anodic tantalum oxide layers and anodic zinc oxide layers. For example, in some embodiments, a composite gas separation module includes a porous anodic tantalum oxide layer or a porous anodic zinc oxide layer.

The composite gas separation module includes a dense gas-selective membrane, wherein the dense gas-selective membrane overlies the porous anodic aluminum oxide layer. In one embodiment, the dense gas-selective membrane is selectively permeable to hydrogen, e.g., the dense gas-selective membrane is a dense hydrogen-selective membrane and can include one or more hydrogen-selective metals or alloys thereof. "Hydrogen-selective metals" include, but are not limited to, niobium (Nb), tantalum (Ta), vanadium (V), palladium (Pd), zirconium (Zr) and hydrogen-selective alloys thereof. Palladium and alloys of palladium are preferred. For example, palladium can be alloyed with at least one of the metals selected from the group consisting of copper, silver, gold, platinum, ruthenium, rhodium, yttrium, cerium and indium.

Where the gas separation module is to be used at temperatures below about 300° C., the dense gas-selective membrane can be formed of a palladium alloy such as, for example, an alloy of about 75 to about 77 weight percent palladium and about 25 to about 23 weight percent silver. An alloy is typically preferred at low temperatures because pure palladium can undergo a phase change in the presence of hydrogen at or below about 300° C. and this phase change can lead to embrittlement and cracking of the membrane after repeated cycling in the presence of hydrogen.

In one embodiment, the dense gas-separation membrane can include one or more non-metallic components. In another embodiment, the dense gas-separation membrane can include one or more components that are not gas-selective materials, e.g., components that are not hydrogen-selective materials.

While the thickness of the dense gas-selective membrane can depend, among other factors, on the size of the largest pores in the porous substrate, in some embodiments the dense gas-selective membrane is less than about 25, 20, 15, 12 or less than about 10 microns in thickness. For example, in one embodiment, the thickness of the dense gas-selective membrane is less than about 14 microns such as about 3 to 14 microns. In one particular embodiment, the dense gas-selective membrane is of substantially uniform thickness.

In one aspect, performance of the composite gas separation modules described herein can be assessed by measuring hydrogen flux through the module during operation. For example, hydrogen flux through the composite gas separation modules, in one embodiment, is at least about 4 $Nm^3/m^2$-hr at about 350° C. and with a hydrogen partial pressure difference of about 1 bar.

In one aspect, the invention includes a method for fabricating a composite gas separation module, comprising (a) applying a porous anodic aluminum oxide layer over a porous metal substrate; and (b) applying a dense gas-selective membrane over the porous anodic aluminum oxide layer, thereby forming the composite gas separation module. Suitable porous metal substrates, porous anodic aluminum oxide layers, and dense hydrogen-selective membranes are described supra. A description of suitable fabrication techniques follows.

In one embodiment, applying a porous anodic aluminum oxide layer over a porous metal substrate includes applying an aluminum metal layer over the porous metal substrate. Any technique for applying a aluminum metal layer over a metal substrate can be used to apply the aluminum metal layer. Examples of which include sputtering, powder application, paste calorized application, and hot dip aluminizing. Accordingly, applying the aluminum metal layer over the porous metal substrate can include using a technique selected from the group consisting of sputtering, solid aluminum powder application, paste calorized application, and hot dip aluminizing. Hot dip aluminizing technique can be a particularly preferred in some instances in that it is one of the most economical techniques for the aluminizing steel surfaces in large quantities.

Preferably, prior to anodizing, the aluminum metal layer is cleaned. For example, a degreaser such as acetone can be used to clean the aluminum metal layer. Ultrasonic cleaning can also be used. In some embodiments, the aluminum metal layer is etched, for example, chemically etched, e.g., using a concentrated alkaline. For example, in one particular embodiment, aluminum metal layer is etched using 3.0 mol/L NaOH. More aggressive etching, e.g., using 3.0 Mol/L NaOH, can also be used to adjust the thickness of the aluminum metal layer.

In some embodiments, the aluminum metal layer is cleaned, e.g., ultrasonically cleaned, optionally etched, and then polished or annealed (e.g., under an inert atmosphere). As an alternative to annealing under an inert atmosphere, in one embodiment, the aluminum metal layer is annealed under a mixture of helium and hydrogen gas at high temperatures such as about 450° C. to about 550° C., e.g., about 500° C. Preferably, the aluminum metal layer is cleaned, polished, or annealed so as to obtain homogeneous conditions that will later promote pore growth over large areas during anodizing, described infra.

In some instances, applying the aluminum metal layer over the porous metal substrate can include annealing the aluminum metal layer. For example, the aluminum metal layer can be annealed under an inert atmosphere such as, for example, a nitrogen or helium atmosphere. Alternatively, annealing can include treating the aluminum metal layer in an atmosphere of a mixture of helium and hydrogen at an elevated temperature. In some embodiments, the mixture of helium and hydrogen is about 5% to about 10% hydrogen, such as about 10% hydrogen, and the balance helium. The aluminum metal layer can be annealed at elevated temperatures of, for example, about 450° C. to about 550° C., such as about 500° C.

In some instances, applying the aluminum metal layer over the porous metal substrate can include polishing the aluminum metal layer. Polishing can include, for example, mechanical polishing, electrochemical polishing, or both. For example, applying the aluminum metal layer over the porous metal substrate can include electropolishing the aluminum metal layer. Preferably, applying the aluminum metal layer over the porous metal substrate includes electropolishing as it can provide for good adhesion of a dense gas-selective membrane to the porous aluminum oxide layer.

In one aspect of the invention, applying a porous anodic aluminum oxide layer over a porous metal substrate includes oxidizing the aluminum metal layer by anodic oxidation, thereby forming a first anodic aluminum oxide layer. In another aspect, applying a porous anodic aluminum oxide layer over a porous metal substrate includes removing at least a portion of the first anodic aluminum oxide layer, thereby forming a template, wherein the template includes unoxidized aluminum metal. In yet another aspect, the aluminum metal of the template is oxidized by anodic oxidation, thereby forming a second anodic aluminum oxide layer.

The aluminum surface can be oxidized in an anodizing cell having a plurality of electrodes. The aluminized porous metal substrate is used as the anode. Cathodes are typically placed symmetrically around the anode. Anodizing can be carried out at a voltage in the range, for example, of about 7 to about 6 V DC. Anodizing can be carried out in a solution of oxalic acid (e.g., about 3% oxalic acid). In some embodiments, anodizing is performed for about 5 min to about 2 hours such as about 15 min to about 1 hour or about one-half hour.

In one embodiment, after oxidizing the aluminum metal of the template by anodic oxidation, a non-porous anodic aluminum oxide layer, or barrier anodic aluminum oxide layer, is present. This non-porous anodic aluminum oxide layer can, in some instances, lie between the porous metal substrate and the second porous anodic aluminum oxide layer or can block pores of the second porous anodic aluminum oxide layer. Thus, one aspect of the present invention includes removing portions of the non-porous anodic aluminum oxide layer, thereby creating or enlarging holes or pores that extend through the anodic aluminum oxide layer (and, in some instances, the non-porous anodic aluminum oxide layer) to the porous metal substrate. One method for removing at least a portion of the non-porous anodic aluminum oxide layer is to expose the non-porous anodic aluminum oxide layer to a solution such as, for example, fluoroborate solution. Thus, in one embodiment, the anodic aluminum oxide layers are treated with an immersion solution to remove non-porous anodic aluminum oxide. An immersion solution can exert a strong effect on the barrier layer. The interaction between an immersion solution and a porous anodic aluminum oxide layer can be substantially insignificant. An immersion solution can be used also to clean blocked pores of the porous anodic aluminum oxide layer and thereby improve its gas permeability. One specific preferred immersion solution is nickel fluoroborate, e.g., about 160 g/L, and zinc fluoroborate, e.g., about 50 g/L. To increase the adhesion strength of a gas selective membrane such as one containing palladium or a palladium alloy, triethanolamine (e.g., about 30 g/L) can be added to an immersion solution.

By removing non-porous anodic aluminum oxide, holes or pores can be created or enlarged that extend through the anodic aluminum oxide composition.

An alkaline solution, e.g., about 3 mol/L NaOH, can be used to remove traces of aluminum metal bonded to a substrate (e.g., from the tube side of a porous metal substrate). In some embodiments, the alkaline solution can be followed by treatment with dilute acid such as phosphoric acid ($H_3PO_4$) solution to prevent or reduce corrosion of a porous metal substrate.

In some embodiments, the second-anodic aluminum oxide layer contains pores that contain or that are blocked by contaminants (e.g., components of the electrolyte solution) and the invention further includes removing contaminants from the pores. In some instances, removing contaminants from the pores can include treating the aluminum oxide with an immersion solution. In other instances, removing contaminants from the pores includes treating the second anodic aluminum oxide layer with a pressurized gas.

Pressurizing by inert gas (e.g., from a shell side) can also be used to remove traces of aluminum metal (e.g., from a tube side). Such a procedure can be applied before or after the application of a gas-selective membrane such as a membrane containing palladium or an alloy.

In one specific embodiment, applying a porous anodic aluminum oxide layer over a porous metal substrate includes (a) applying an aluminum metal layer over the porous metal substrate; (b) oxidizing the aluminum metal layer by anodic oxidation, thereby forming a first anodic aluminum oxide layer; (c) removing at least a portion of the first anodic aluminum oxide layer, thereby forming a template, wherein the template includes unoxidized aluminum metal; and (d) oxidizing the aluminum metal of the template by anodic oxidation, thereby forming the porous anodic aluminum oxide layer. Further, the embodiment can also include removing aluminum oxide or aluminum metal from blocked pores of the porous anodic aluminum oxide layer.

Following application of the porous anodic aluminum oxide layer, a dense gas-selective membrane can be applied over the porous anodic aluminum oxide layer. For example, a dense gas-selective membrane can be applied by depositing a gas-selective metal, e.g., a hydrogen-selective metal, over the porous anodic aluminum oxide layer. In one embodiment, palladium or an alloy thereof is deposited, e.g., electrolessly plated, over the porous anodic aluminum oxide layer to form a dense gas-selective membrane. Application of the dense gas-selective membrane can include surface activating the porous anodic aluminum oxide layer prior to depositing dense gas-selective membrane components.

Components of the dense gas-selective membrane, e.g., a hydrogen-selective metal or an alloy thereof, can be deposited over the porous anodic aluminum oxide layer using any of the techniques known in the art for depositing such materials on a support. For example, a component of the dense gas-selective membrane can be deposited on the support using electroless plating, thermal deposition, chemical vapor deposition, electroplating, spray deposition, sputter coating, e-beam evaporation, ion beam evaporation or spray pyrolysis.

An alloy of a gas-selective metal can be deposited over the porous anodic aluminum oxide layer as a component of the dense gas-selective membrane. In one embodiment, a palladium/silver alloy is formed by first depositing palladium onto the support by electroless deposition and then depositing silver, also by electroless deposition, onto the support. An alloy membrane layer can then be formed by heating the silver and palladium layers, for example, to about 500° C. to about 1000° C. in an inert or hydrogen atmosphere. In one embodiment, metal components can be co-deposited onto the support to form a layer of a finely divided mixture of small pockets of the pure metal components. In another embodiment, a technique such as sputtering or chemical vapor deposition is used to simultaneously deposit two or more metals to form an alloy layer on the support.

In one aspect, the present invention includes a method for selectively separating hydrogen gas from a hydrogen gas-containing gaseous stream, by which method, hydrogen gas is at least partially partitioned from the gaseous stream by passing through a dense hydrogen-selective membrane. The method includes directing the hydrogen gas-containing gaseous stream to a composite gas separation module, wherein the composite gas separation module includes: (a) a porous metal substrate; (b) a porous anodic aluminum oxide layer, wherein the porous anodic aluminum oxide layer overlies the porous metal substrate; and (c) a dense hydrogen-selective membrane, wherein the dense hydrogen-selective membrane overlies the porous anodic aluminum oxide layer.

The porous anodic aluminum oxide layer can be formed using any of the techniques described herein. Preferably, the dense hydrogen-selective membrane includes palladium or an alloy thereof.

When the composite gas separation module is exposed to a hydrogen gas-containing atmosphere (e.g., a gaseous stream), the dense hydrogen-selective membrane can cause the hydrogen gas to dissociate and diffuse through the membrane. As a result, hydrogen is selectively removed from the hydrogen gas-containing gaseous stream into a volume on the opposite side of the gas separation module. A pressure gradient of hydrogen, wherein the hydrogen partial pressure of the hydrogen gas-containing gaseous stream is greater than the hydrogen partial pressure on the opposite side of the gas separation module, can be maintained to increase the flux of hydrogen through the dense hydrogen-selective membrane of the composite gas separation module.

Specific applications for which the composite gas separation module is well-suited include, but are not limited to, hydrogenation/dehydrogenation reactions, methane/steam reforming reactions, and other steam reforming reactions or autothermal reforming of methane. In one embodiment, the present invention includes the step of reacting hydrogen gas-producing reactants to produce the gaseous stream from which hydrogen gas is at least partially partitioned.

In dehydrogenation reactions, the reaction products include hydrogen gas. Reactants, at least one of which includes molecularly-bound hydrogen, can be placed surrounding, between or within composite gas separation modules as described herein. As the reaction proceeds, hydrogen gas can be removed by the composite gas separation module from the volume wherein the reactants react. Since these reactions are generally thermodynamic equilibrium controlled, the reaction can be limited by the accumulation of hydrogen gas and the reaction reaches equilibrium when a sufficient quantity of hydrogen has accumulated. When hydrogen is separated from the reactants, however, conversion can reach 95% or more. In a methane/steam reforming, methane and steam can be passed through or around a tubular composite gas separation module in the presence of a catalyst. The methane and steam react to produce carbon dioxide and hydrogen, and the hydrogen can be dissociated through the dense hydrogen-selective membrane and thereby separated from the other gases.

Composite gas separation modules and other methods for fabrication suitable for use in conjunction with the present invention are described in U.S. Pat. No. 6,152,987, issued to Ma, et al. on Nov. 28, 2000; U.S. Pat. No. 7,172,644, issued to Ma, et al. on Feb. 6, 2007; U.S. Pat. No. 7,175,694, issued to Ma, et al. on Feb. 13, 2007; U.S. Pat. No. 7,255,726, issued to Ma, et al. on Apr. 30, 2004; U.S. patent application Ser. No. 10/804,847, entitled "Method for Fabricating Composite Gas Separation Modules," by Ma, et al., filed on Mar. 19, 2004; and U.S. patent application Ser. No. 10/896,743, entitled "Composite Gas Separation Modules Having a Layer of Particles with a Uniform Binder Metal Distribution," filed on Jul. 21, 2004; each of which is incorporated herein by reference in its entirety.

Details of surface activation and metal deposition that can be employed in various embodiments of the invention follow under separate subheadings.

Surface Activation

The present method for forming a composite gas separation module can include surface activating a support prior to deposition of a desired material (e.g., components of the dense gas-selective membrane). In one embodiment, the surface of the porous anodic aluminum oxide layer is surface activated prior to applying a dense gas-selective membrane over the porous anodic aluminum oxide layer. In addition, applying a dense gas-selective membrane over the porous anodic aluminum oxide layer can include surface activating the support between applications of components of the dense gas-selective membrane.

In one embodiment, surface activation includes seeding the surface of the support with nuclei of a hydrogen-selective metal such as with palladium nuclei. Without wishing to be held to any particular theory, it is believed that when a surface activated support is electrolessly plated, the palladium nuclei on the surface activated substrate initiate, in the presence of a reducing agent such as hydrazine, an autocatalytic process of reducing a metastable palladium salt complex on the surface.

In one embodiment, the support is surface activated by treating it with liquid activation compositions such as, for example, aqueous stannous chloride ($SnCl_2$) and palladium chloride ($PdCl_2$). In one embodiment, the support is surface activated to seed substantially all of the surfaces of the support with nuclei of a hydrogen-selective metal, e.g., palladium. For example, the support can be surface activated by first immersing it in the aqueous acidic $SnCl_2$ bath (e.g., an about 1 g/L aqueous $SnCl_2$ bath) for a suitable time, such as about five minutes, to sensitize the support. Then, the support can be immersed for a suitable time, such as about five minutes, in an aqueous acidic $PdCl_2$ bath (e.g., an about 0.1 g/L aqueous $PdCl_2$ bath) to seed the support with palladium nuclei. The temperature of each bath is typically about 15° C. to about 25° C., for example, about 20° C. Ordinarily, after each immersion in the $SnCl_2$ bath, the support is rinsed with water, for example, deionized water. Typically, after each immersion in the $PdCl_2$ bath, the support is rinsed first with hydrochloric acid, preferably dilute hydrochloric acid, for example, 0.01 M hydrochloric acid, and then with water. Rinsing with hydrochloric acid can be used to prevent hydrolysis of the palladium ions.

During rinsing, after immersion of the support in the acidic stannous chloride bath, stannous ions on the surface of the support can be partially hydrolyzed to form relatively-insoluble products, for example, $Sn(OH)_{1.5}Cl_{0.5}$ and other more complicated hydroxyl-chlorides. The products of hydrolysis can be strongly attached to the surface as a layer having a thickness on the order of a few angstroms. The composition, structure and thickness of this layer can depend on factors such as the ratio of hydrochloride to stannous chloride; the structure, roughness and shape of the support surface; and the hydrodynamic regime of rinsing. This layer is thought to reduce the $Pd^{2+}$ ions from the $PdCl_2$ bath to $Pd^0$ to form the nuclei or seeds on the surface of the support.

Generally, the above-described process of treating the support with $SnCl_2$ and then with $PdCl_2$ is repeated as necessary to provide a surface activated support. The exact number of repetitions of treatment with $SnCl_2$ and then with $PdCl_2$ depends on the intensity of surface activation that is desired. Typically, the treatment with $SnCl_2$ and then with $PdCl_2$ is preformed at least one time such as about 2 to about 10 times or, preferably, about 2 to about 5 times. In one preferred embodiment, the surface activated support has a uniform dark-brown color and a smooth surface.

Thus, the surface activated support can include a structure having a number of thin layers of palladium nuclei, each formed after performing a surface activation process (such as by treating the support with $SnCl_2$ and then with $PdCl_2$). These preseeded palladium nuclei can reduce the induction period of the autocatalytic process at the start of electroless palladium plating.

While the surface activation of a support using palladium nuclei has been illustrated above, methods for forming surface activated supports suitable for the plating of other metals are well-known to those of ordinary skill in the art.

Alternatively, a metal or alloy (e.g., palladium or alloy thereof) can be deposited on a support without surface activation of the support. However, absent surface activation, plating of the support with the metal can be slow.

Metal Deposition

Deposition of a material on a support can include plating the support with a metal (e.g., a hydrogen-selective metal). For example, depositing a metal on a support, such as applying the dense gas-selective membrane can employ an electroless plating technique such as the method that follows.

In one embodiment, plating is conducted by electroless plating. For example, palladium deposition can occur according to the autocatalytic reactions of Chemical Equations I and II:

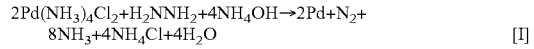

[I]

or

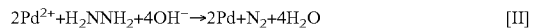

[II]

In one embodiment, a plating solution is prepared that contains the following: 4.0 g/L $Pd(NH_3)_4Cl_2.H_2O$; 198 mL/L $NH_4OH$ (28%); 40.1 g/L $Na_2EDTA$; and 5.6-7.6 mL/L $H_2NNH_2$ (1 M). This plating solution can be maintained at a temperature from about 20° C. to about 90° C. such as, for example, about 60° C. Typically, the plating solution has a pH of approximately 10.4 and is provided in a quantity sufficient to provide approximately 3.5 cm$^3$ of solution per square centimeter of plating area.

The plating solution can be contained in a plating vessel which can be jacketed to provide temperature control. For example, the plating vessel can be kept in a temperature controlled water bath. The support is typically introduced to the plating solution to begin deposition of the palladium.

After about one hour of steady-state deposition of palladium onto the support, the plating activity decreases with a depletion of palladium ions and hydrazine ($H_2NNH_2$) and a decrease in the pH of the plating solution. After depletion of the plating solution, a new solution can be provided and the procedure repeated. A stable high rate of deposition for each plating can be achieved not only by changing the plating solution, but also by carefully rinsing the deposited metal between platings. Typically, the deposited metal is rinsed a minimum of about five times, e.g., with deionized water at about 50° C. to about 60° C. for about 2 to about 5 minutes.

As alternatives to electroless plating, a material, e.g., palladium, can be deposited on the support by other suitable metal deposition techniques known in the art, such as thermal deposition, chemical vapor deposition, electroplating, spray deposition, sputter coating, e-beam evaporation, ion beam evaporation or spray pyrolysis.

The present invention also includes a composite filter comprising: (a) a porous non-aluminum metal substrate; and (b) a porous anodic aluminum oxide layer, wherein the porous anodic aluminum oxide layer overlies the porous non-aluminum metal substrate, and wherein the porous anodic aluminum oxide layer defines pores extending from a first side of the porous anodic aluminum oxide layer through the porous anodic aluminum oxide layer to a second side of the porous anodic aluminum oxide layer.

The porous non-aluminum metal substrate can include any of the non-aluminum metal substrates described supra.

In some embodiments, the porous anodic aluminum oxide layer is at least about 10 microns thick such as at least about 25, 50, 75, 100, or about 150 microns thick.

The porous anodic aluminum oxide layer can define pores extending from a first side of the porous aluminum oxide layer through the porous anodic aluminum oxide layer to a second side of the porous anodic aluminum oxide layer.

In general, the pores of the porous anodic aluminum oxide layer are smaller than the pores of the porous metal substrate. The pores of the porous anodic aluminum oxide layer can be, for example, nanometer-scale pores. In some embodiments, the porous anodic aluminum oxide layer defines pores with a mean diameter of about 1 nanometers (nm) to about 1000 nm. For example, the porous anodic aluminum oxide layer can define pores having an mean pore diameter of less than about 500 nm, 200 nm, or less than about 100 nm.

In some aspects of the invention, the porous metal substrate defines pores having an first mean pore diameter, wherein the porous anodic aluminum oxide layer defines pores having a second mean pore diameter, and wherein the second mean pore diameter is less than the first mean pore diameter. For example, the first mean pore diameter can be less than about half of the first mean pore diameter or less than about one-tenth of the first mean pore diameter. In some embodiments, the largest pore of the porous anodic aluminum oxide layer is smaller than the largest pore of the porous metal substrate.

In some embodiments, the porous anodic aluminum oxide layer includes a layer of aluminum metal. For example, the porous anodic aluminum oxide layer can include a layer or pockets of aluminum metal that underlies a layer of aluminum oxide.

The present invention also includes a method for fabricating a composite filter, comprising: (a) applying an aluminum metal layer over a porous non-aluminum metal substrate; (b) oxidizing the aluminum metal layer by anodic oxidation, thereby forming a first anodic aluminum oxide layer; (c) removing at least a portion of the first anodic aluminum oxide layer, thereby forming a template, wherein the template includes unoxidized aluminum metal; and (d) oxidizing the aluminum metal of the template by anodic oxidation, thereby forming a porous anodic aluminum oxide layer. Each of these steps can be performed as has already been described supra with respect to forming a porous anodic aluminum oxide layer on a porous metal substrate.

As also described supra, in some instances, non-porous anodic aluminum oxide or aluminum metal can be present with the porous anodic aluminum oxide and the method can further include removing non-porous anodic aluminum oxide or aluminum metal as described supra.

EXEMPLIFICATION

The invention will now be further and specifically described by the following examples which are not intended to be limiting.

Example 1

This example describes the preparation of thin aluminum layers bonded to metal substrate surfaces.

Figure 3:
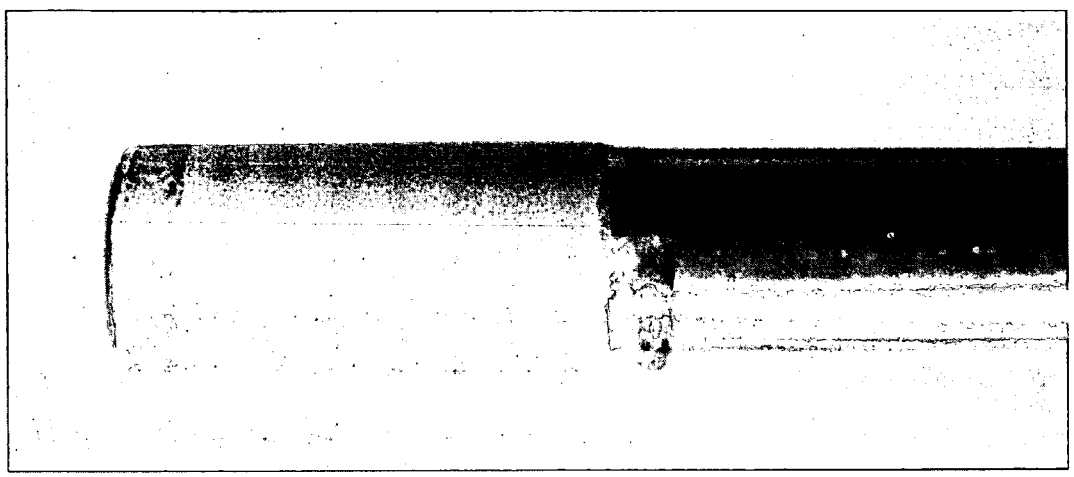
FIG. 3 is a picture of a PSS tube assembly made by sputtering aluminum metal onto a PSS tube.

A bonded aluminum layer was formed by sputtering aluminum metal onto the outside surface of a 0.1 micron grade porous 316L stainless steel ("PSS") substrate tube manufactured by Mott Metallurgical Corporation. FIGS. 2A to 2D are optical micrographs of a cross section of the PSS tube under various magnifications. FIG. 3 shows a 0.5 inch O.D. (outside diameter) PSS tube assembly having about 176 microns (determined gravimetrically) of aluminum metal sputtered onto a PSS tube (surface area 10 $cm^2$).

Figure 4:
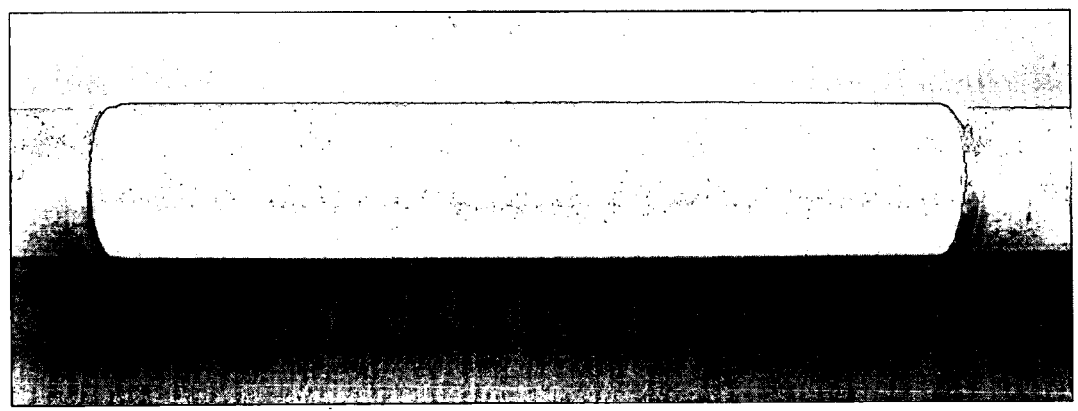
FIG. 4 is a picture of an INCONEL® tube assembly made by sputtering aluminum metal onto a INCONEL® tube.

A bonded aluminum layer was formed by sputtering aluminum metal onto the outside surface of a 0.1 micron grade porous INCONEL® substrate tube. FIG. 4 shows the 1.0 inch O.D. INCONEL® tube assembly that was made by sputtering aluminum metal onto the INCONEL® tube (surface area 120 $cm^2$) for an aluminum thickness of 60 microns (determined gravimetrically).

Example 2

This example describes formation of porous anodic aluminum oxide layers by anodic oxidation of aluminum surfaces.

Figure 5A:
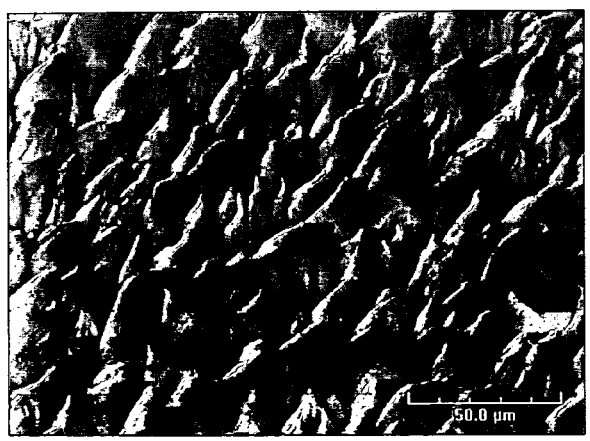
FIGS. 5A and 5B are SEM images of an aluminum surface before electropolishing (FIG. 5A) and after electropolishing (FIG. 5B).
Figure 5B:
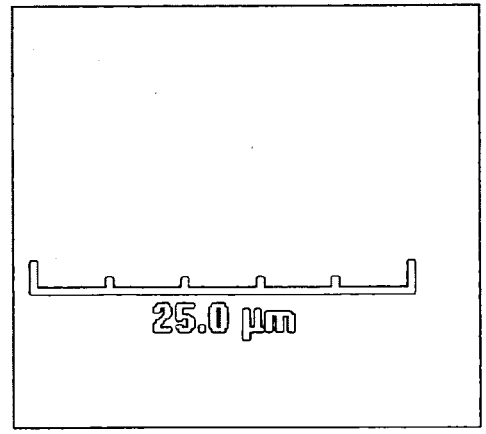
Figure 6:
FIG. 6 is a photograph of an aluminized PSS tube after electropolishing.

The aluminum surface of an aluminum foil (5.5 $cm^2$, 2 millimeters thick) was degreased in acetone and then ultrasonically cleaned. Next, the aluminum foil was rinsed in deionized ("DI") water and etched in 3.0 mole/liter (mol/L) sodium hydroxide (NaOH) until bubbles occurred over the surface. The aluminum foil was then cleaned ultrasonically in DI water. The aluminum surface was then electropolished in a perchloric acid and ethanol mixture (70% $HClO_4$ and $C_2H_5OH$ at 1:3) at 20 volts (V) for 5 minutes. FIGS. 5A and 5B are SEM images of the aluminum surface before electropolishing (FIG. 5A) and after electropolishing (FIG. 5B). FIG. 6 is a photograph of an aluminized PSS tube (surface area 10 $cm^2$) aluminized with 176 microns of metal as described in Example 1 after electropolishing.

Experiments were performed wherein an anodic aluminum layer was formed on a cleaned aluminum foil (5.5 $cm^2$, 2 millimeters thick) to demonstrate pore initiation. The clean aluminum foil was placed as the anode in a anodizing cell having a two electrode configuration at constant voltage (40 V) and 2.5 amperes (A) in a 200 mL solution of 3% oxalic acid hydrate ($H_2C_2O_4 \cdot 2H_2O$) for one hour. An anodic aluminum oxide layer was thereby formed on the aluminum surface.

Figure 7:
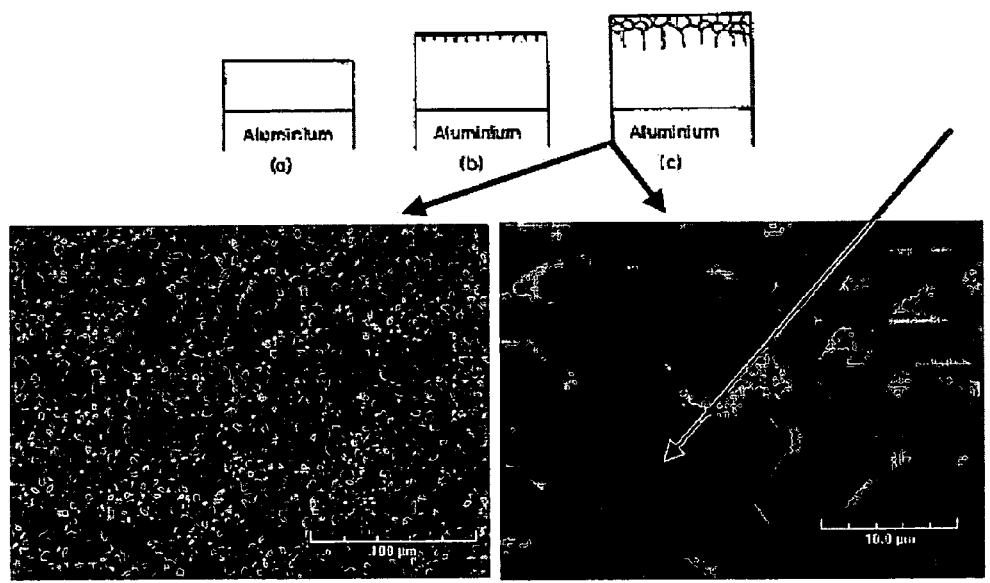
FIG. 7 contains schematic representations (a, b, and c) of the development of penetration paths in an aluminum sheet which is believed to have occurred.

FIG. 7 contains schematic representations (a, b, and c) of the development of penetration paths in the aluminum sheet which is believed to have occurred. FIG. 7 also contains SEM images of the aluminum surface after treatment in the anodizing cell. FIGS. 8A and 8B are magnified views of the point marked by the arrow in FIG. 7. Note that the aluminum surface in these experiments was not electropolished.

Then, the anodic aluminum oxide layer was removed completely by immersing the sample in a mixture of phosphoric and chromic acid solution (6% $H_3PO_4$ +1.8% $H_2CrO_4$) at 60° C. under ultrasonic conditions for 0.5 hour followed by multiple distilled water rinsing. Only the anodic aluminum oxide layer was removed in this step, leaving the aluminum base intact.

After the alumina film was stripped off, the sample underwent steady state anodizing under the same conditions as before (two electrode configuration at constant voltages 40 V from a solution of 3% $H_2C_2O_4.2H_2O$). The rate of the anodizing depth was 0.5 microns/Coulomb/cm². A porous anodic aluminum oxide layer was thereby formed on the aluminum surface. FIGS. 9A and 9B are SEM images of the porous anodic aluminum oxide layer and illustrate the morphology of the porous anodic aluminum oxide.

In some instances, a barrier layer can exist at the pores of the porous anodic aluminum oxide layer. Such a barrier layer can be removed by the immersion in a fluoroborate solution. Such an immersion solution can exert a stronger effect on the barrier layer. The interaction between this immersion solution and the porous anodic oxide layer is thought to be insignificant. This immersion solution can be used also to clean blocked pores of the porous anodic aluminum oxide layer and improve its gas permeability. A preferred immersion solution is nickel fluoroborate (e.g., 160 grams/liter (g/L)), and zinc fluoroborate (e.g., 50 g/L). To strengthen the adhesion of a gas-selective membrane such as a membrane containing palladium or an alloy, triethanolamine (e.g., 30 g/L) can be added to an immersion solution.

An alkaline solution of 3.0 mol/L NaOH can be used to remove traces of aluminum metal bonded to a substrate (e.g., from the tube side of a PSS substrate) followed by diluted phosphoric acid ($H_3PO_4$) solution treatment to prevent corrosion of the PSS. This procedure could be used after the application of a gas selective layer such as a membrane containing palladium or an alloy.

Figure 10:
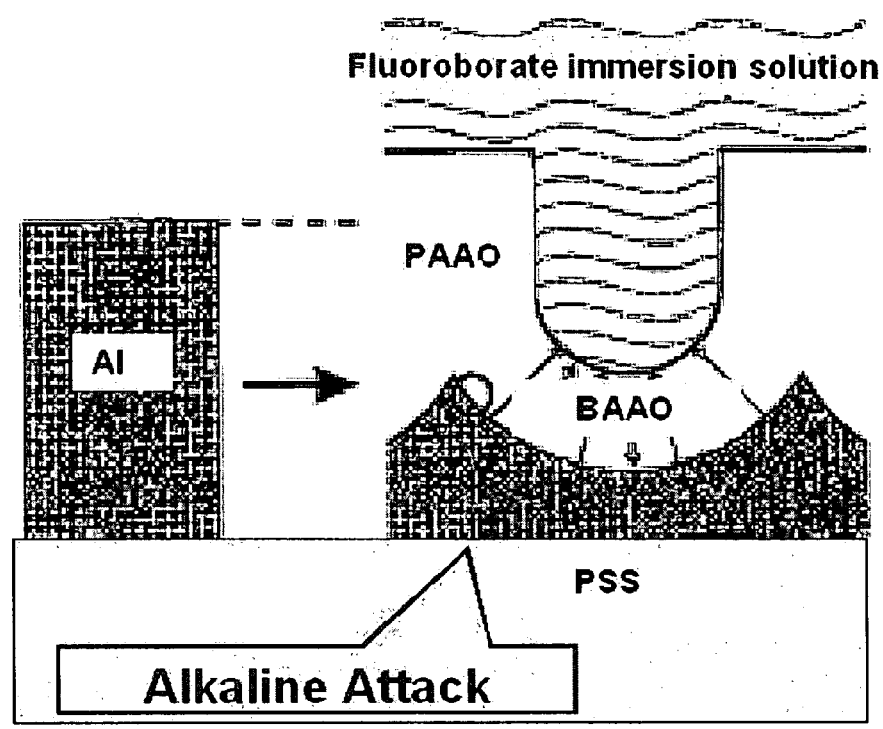
FIG. 10 is a schematic representation of how an immersion solution and an alkaline solution could be used to remove a barrier anodic aluminum oxide layer (BAAO) and to remove traces of aluminum metal bonded to a substrate.

FIG. 10 is a schematic representation of how an immersion solution and an alkaline solution could be used to remove a barrier anodic aluminum oxide layer (BAAO) and to remove traces of aluminum metal bonded to a substrate.

Pressurizing by inert gas can be used to remove contaminants from hole or pores of the anodic aluminum oxide layer.

Example 3

This example describes the formation of composite gas-separation module according to one embodiment of the present invention.

An aluminized 0.5 inch O.D. PSS tube assembly was used having a porous part length of about 1 inch and a gravimetrically estimated aluminum metal thickness of 176 microns. FIG. 3 is a picture of the assembly. The assembly was cleaned with acetone.

The aluminized PSS tube was electropolished using a four electrode configuration in a glass cylinder. The aluminum metal-coated PSS tube was used as the anode. Three 0.25 inch O.D. aluminum rod cathodes were symmetrically placed around the anode. The distances between the anode surface and the cathodes were approximately 0.375 inch. The electropolishing was carried out in a voltage range of 6.7-5.0 V DC for five minutes. The initial voltage on the electrodes without electrolyte solution was set at 20 V DC. The electrolyte solution used for the electropolishing was a mixture of 70% $HClO_4$ and $C_2H_5OH$ in a 1:3 proportion. The electropolished substrate was rinsed in DI water and $C_2H_5OH$ and dried at 140° C. for two hours. The gravimetrically measured thickness of the aluminum metal layer was 110 microns after electropolishing. FIG. 6 is a picture of the sample after electropolishing.

The aluminum surface was oxidized in a anodizing cell having a four electrode configuration in a glass cylinder. The aluminized PSS tube was used as the anode. Three cathodes were symmetrically placed around the anode. Three 0.25 inch O.D. cleaned aluminum rod cathodes were symmetrically placed around the anode. The distances between the anode surface and the cathodes were approximately 0.375 inch. Anodizing was carried out at a voltage in the range 6.7-6.2 V DC from a solution of 3% oxalic acid for one-half hour. The initial voltage on the electrodes without the electrolyte solution was set at 40 V DC. The resulting support with a porous anodic aluminum oxide layer was rinsed in DI water and dried at 140° C. for two hours.

Figure 11:
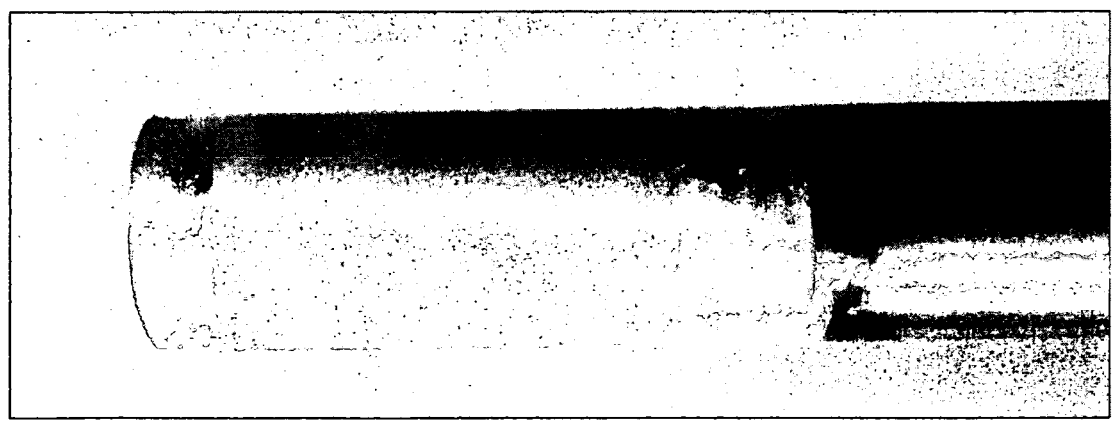
FIG. 11 is a picture of a composite hydrogen separation module after testing under helium (for 400 hours) and pure hydrogen atmosphere (for 300 hours) at 350° C., 400° C., 450° C., and 500° C. at pressure differences up to 4 atmospheres.

A dense palladium hydrogen-selective layer was then applied to the porous anodic aluminum oxide layer by electroless palladium deposition. The thickness of the dense palladium layer, estimated gravimetrically, was 28 microns. The membrane was tested under helium (for 400 hours) and pure hydrogen atmosphere (for 300 hours) at 350° C., 400° C., 450° C., and 500° C. The hydrogen permeance of this membrane was about 8 m3/m2·h·atm 0.5 at 500° C. FIG. 11 shows this sample after the high temperature treatment at pressure differences up to 4 atmospheres. This membrane became stable after this treatment without measurable helium leak with pressure difference between the shell side and the tube side up to 4 atmospheres (the membrane had "infinity" selectivity). This composite hydrogen separation module was stable with a highly selective palladium membrane.

Example 4

This example describes annealing an aluminized PSS support under a helium-hydrogen ($He$—$H_2$) atmosphere at 500° C.

Figure 12:
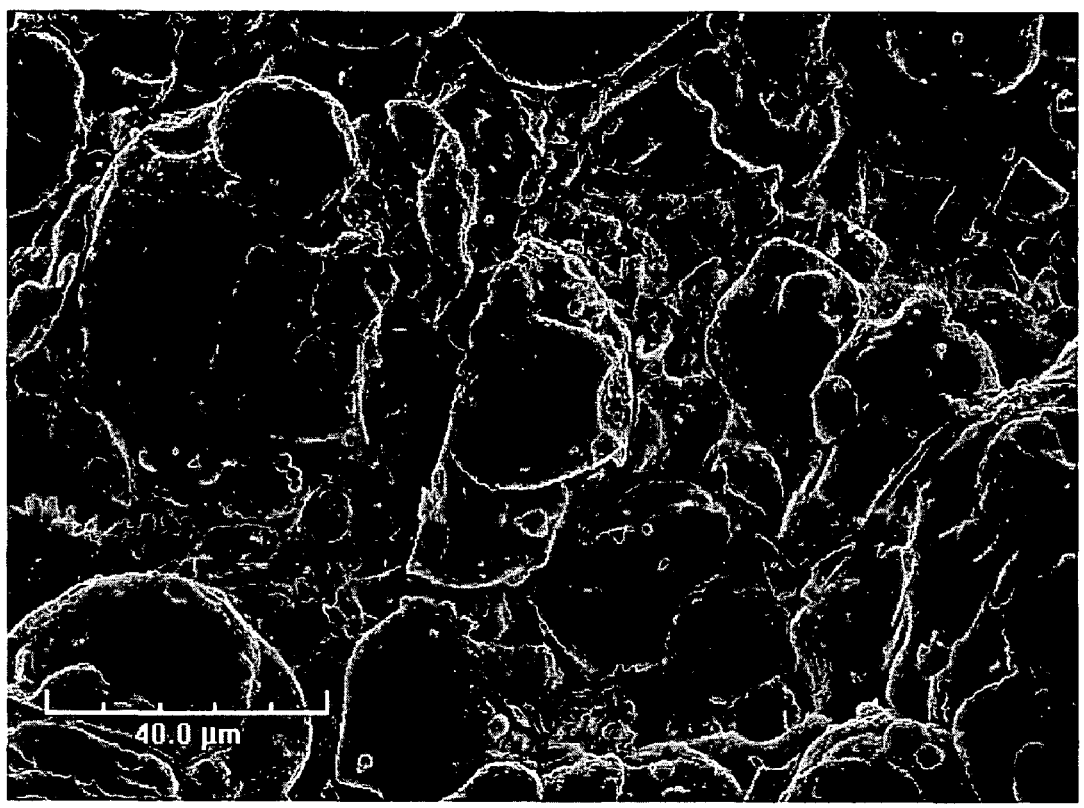
FIG. 12 shows a SEM image (SEI) of the surface formed by aluminum coating a Mott support.

Aluminum coated PSS supports sometimes have a granular surface structure and are not gas dense. FIG. 12 shows the SEM image (SEI) of the surface formed of aluminum coating on a 0.1 micron grade 316L PSS support obtained from Mott Metallurgical Corporation (magnification=1000×).

An attempt to anneal an aluminized PSS substrate under nitrogen or helium atmosphere at 500° C. resulted in the oxidation and destruction of the aluminum metal layer. Preliminary annealing experiments at 500° C. in helium showed that the aluminum metal surface of the substrate was very susceptible to oxidation from trace $H_2O$ and $O_2$ contaminates.

Figure 13:
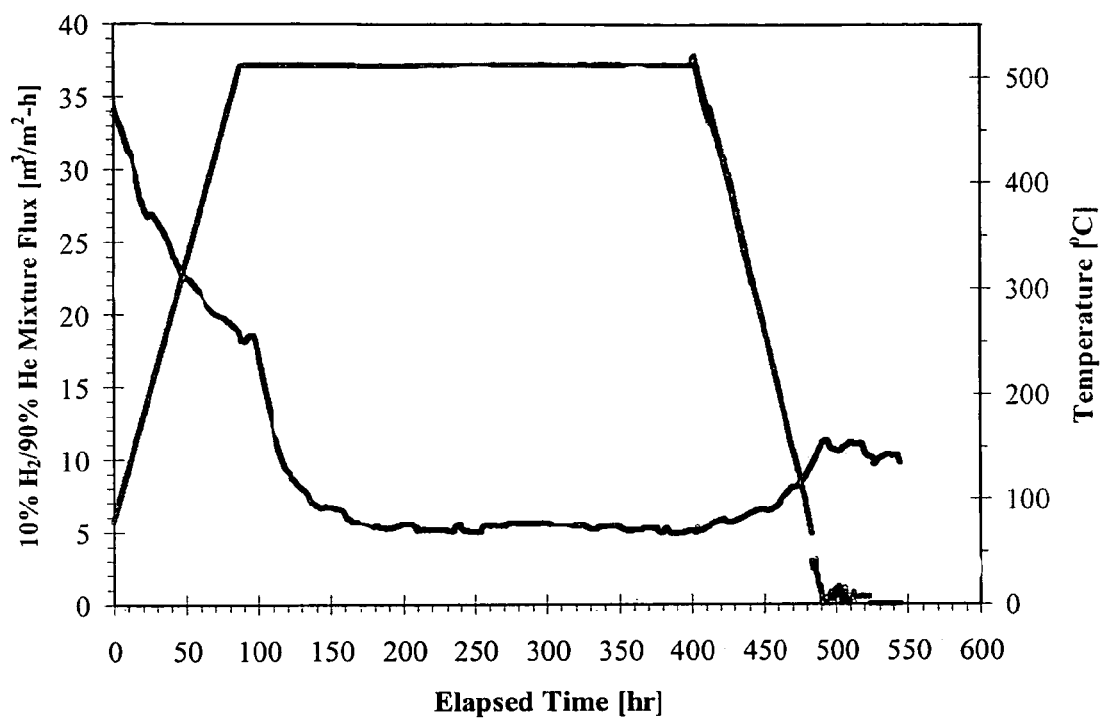
FIG. 13 is a plot showing the temperature history and changes in gas flux through an aluminized PSS composite during annealing in helium with 10% hydrogen at 500° C.
Figure 14:
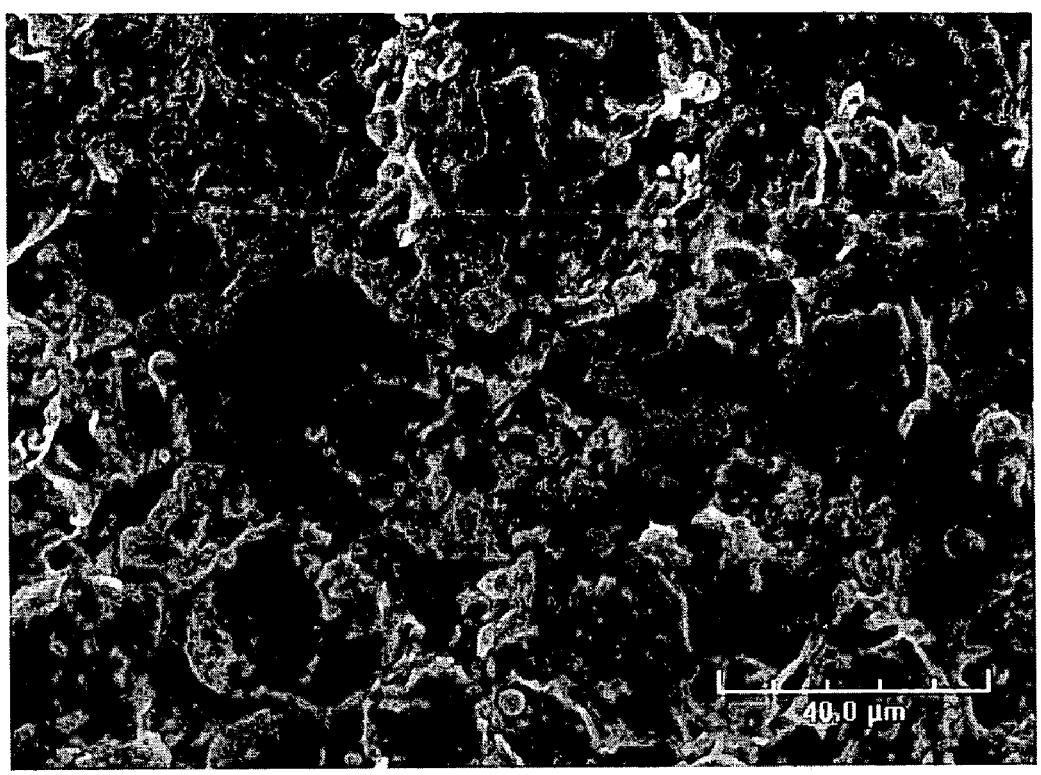
FIG. 14 is an SEM (SEI) image of the surface of an aluminum metal coating after annealing at 500° C. under a helium-hydrogen atmosphere.

To avoid oxidation and destruction of the aluminum metal layer on the PSS surface an atmosphere of a mixture of helium and 5-10% hydrogen was used at 500° C. The plot presented in FIG. 13 shows the temperature history and changes of gas flux through an aluminized PSS composite during annealing in helium with 10% hydrogen at 500° C. The initial helium flux at room temperature was 35 Nm³/m²·hr at pressure difference of 1 atmosphere and was reduced by about 75%. The gas flux decreased during heating to 500° C. and most of this decrease (up to about 400° C.) was likely due to a reduction in density of the gas mixture. However, a decrease between 100 and 200 hours occurred at a constant temperature of 500° C. This reduction in gas flux provided a good indication that the aluminum metal particles in the layer achieved a greater degree of sinter bonding during the annealing. FIG. 14 is an SEM (SEI) image of the surface of the aluminum metal coating after annealing at 500° C. under a helium-hydrogen atmosphere.

While this invention has been particularly shown and described with references to example embodiments thereof, it will be understood by those skilled in the art that various changes in form and details may be made therein without departing from the scope of the invention encompassed by the appended claims.

We claim:

1. A composite gas separation module, comprising:
   a) a porous metal substrate of at least one member selected from the group consisting of stainless steel, chromium and nickel;
   b) a porous anodic aluminum oxide layer, wherein the porous anodic aluminum oxide layer overlies the porous metal substrate; and
   c) a dense gas-selective membrane, wherein the dense gas-selective membrane overlies the porous anodic aluminum oxide layer.

2. The composite gas separation module of claim 1 wherein the dense gas-selective membrane is a dense hydrogen-selective membrane.

3. The composite gas separation module of claim 2 wherein the dense hydrogen-selective membrane includes palladium or an alloy thereof.

4. A composite filter, comprising:
   a) a porous non-aluminum metal substrate of stainless steel; and
   b) a porous anodic aluminum oxide layer, wherein the porous anodic aluminum oxide layer overlies the porous non-aluminum metal substrate, and wherein the porous anodic aluminum oxide layer defines pores extending from a first side of the porous anodic aluminum oxide layer through the porous anodic aluminum oxide layer to a second side of the porous anodic aluminum oxide layer.

5. The composite filter of claim 4 wherein the porous non-aluminum metal substrate defines pores having an first mean pore diameter, wherein the porous anodic aluminum oxide layer defines pores having a second mean pore diameter, and wherein the second mean pore diameter is less than the first mean pore diameter.

6. The composite filter of claim 5 wherein the second mean pore diameter is less than half of the first mean pore diameter.

7. A method for fabricating a composite gas separation module, comprising the steps of:
   a) applying an aluminum metal layer over a porous metal substrate;
   b) oxidizing the aluminum metal layer by anodic oxidation, thereby forming a first anodic aluminum oxide layer;
   c) removing at least a portion of the first anodic aluminum oxide layer, thereby forming a template, wherein the template includes unoxidized aluminum metal;
   d) oxidizing the aluminum metal of the template by anodic oxidation, thereby forming the porous anodic aluminum oxide layer; and
   e) applying a dense gas-selective membrane over the porous anodic aluminum oxide layer, thereby forming the composite gas separation module.

8. The method of claim 7 wherein the gas-selective membrane is a hydrogen-selective membrane.

9. A method for fabricating a composite filter, comprising:
   a) applying an aluminum metal layer over a porous non-aluminum metal substrate;
   b) oxidizing the aluminum metal layer by anodic oxidation, thereby forming a first anodic aluminum oxide layer;
   c) removing at least a portion of the first anodic aluminum oxide layer, thereby forming a template, wherein the template includes unoxidized aluminum metal; and
   d) oxidizing the aluminum metal of the template by anodic oxidation, thereby forming a porous anodic aluminum oxide layer.

10. The method of claim 9 wherein the porous anodic aluminum oxide layer includes non-porous anodic aluminum oxide and further comprising removing at least a portion of the non-porous anodic aluminum oxide from the porous anodic aluminum oxide layer.

11. The method of claim 7 further including annealing the aluminum metal layer in an atmosphere comprising an inert gas and hydrogen gas.

* * * * *